US005878229A

United States Patent [19]
Bass et al.

[11] Patent Number: 5,878,229
[45] Date of Patent: Mar. 2, 1999

[54] MAINTAINING FRAME SEQUENCE IN A MULTIPROCESSOR NETWORK DEVICE

[75] Inventors: Brian M. Bass, Apex; Edward Hau-chun Ku, Cary; Scott J. Lemke, Raleigh; Joseph M. Rash, Wake Forest; Loren Blair Reiss, Raleigh, all of N.C.

[73] Assignee: International Business Machines Corporation, Armonk, N.Y.

[21] Appl. No.: 968,677

[22] Filed: Nov. 12, 1997

[51] Int. Cl.[6] .............................. G06F 13/38; G06F 13/14; H04Q 11/04
[52] U.S. Cl. ................................ 395/200.66; 395/200.62; 395/200.64; 370/388; 370/394
[58] Field of Search ........................ 395/200.61, 200.57, 395/200.32, 800.16, 200.66, 200.16, 200.49, 200.33, 200.5, 825, 200.34; 370/315, 437, 431, 395, 389, 314, 369, 434, 388, 394, 422; 711/143, 145; 364/DIG. 1, DIG. 2

[56] References Cited

U.S. PATENT DOCUMENTS

| | | |
|---|---|---|
| 5,278,828 | 1/1994 | Chao . |
| 5,323,392 | 6/1994 | Ishii et al. . |
| 5,406,556 | 4/1995 | Widjaja et al. . |
| 5,483,521 | 1/1996 | Aramaki . |
| 5,583,868 | 12/1996 | Rashid et al. . |
| 5,590,122 | 12/1996 | Sandorfi et al. . |
| 5,610,914 | 3/1997 | Yamada . |
| 5,617,417 | 4/1997 | Sathe et al. . |
| 5,757,783 | 5/1998 | Eng et al. ............................ 370/315 |

OTHER PUBLICATIONS

"Buffer Management Scheme for Gigabit IP Routers", IBM Technical Disclosure Bulletin, vol. 36, No. 2, Feb. 1993.
"Device Queue Management", IBM Technical Disclosure Bulletin, vol. 31, No. 10, Mar. 1989.

*Primary Examiner*—Daniel H. Pan
*Attorney, Agent, or Firm*—John J. Timar; Felsman, Bradley, Gunter, & Dillon, LLP

[57] ABSTRACT

A sequence in which two or more of the data units enter the network node, via a specific one of the multiple ports, is recorded. And, the two or more of the data units are transmitted from the network node according to the recorded sequence. The method and system achieve the recording of sequence via the following. In response to an insertion of one of the two or more data units into a specific one of the multiple processor subsystems, the specific one of the multiple processor subsystems is associated with a specific one of the multiple ports by which the one of the two or more data units entered the network node, and any other of the multiple processor subsystems that are currently processing on any other of the two or more data units that entered the network node through the specific one of the multiple ports is noted. Thereafter, any request to transmit by the specific one of the multiple processors is honored if it is determined that the data unit with the requesting processor is next according to the recorded sequence. The data unit is determined to be next in sequence if all of the multiple processors, that were processing on other data units which entered through the specific one of the multiple ports, have completed processing.

23 Claims, 17 Drawing Sheets

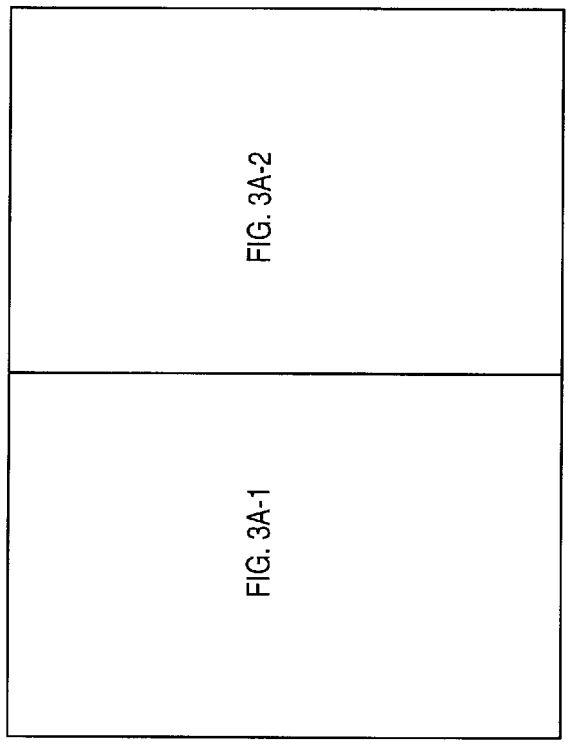

MAINTAINING FRAME SEQUENCE IN A MULTIPROCESSOR NETWORK DEVICE

BACKGROUND OF THE INVENTION

1. Technical Field:

The present invention is related to a method and system to be utilized in data communications. In particular, the present invention is related to a method and system to be utilized in data communications involving at least one data communications network. Yet still more particularly, the present invention is related to a method and system, to be utilized in data communications involving at least one data communications network having at least one multiprocessor network node.

2. Description of the Related Art:

Data communications is the transfer of data from one or more data sources to one or more data sinks that is accomplished (a) via one or more data links between the one or more sources and one or more sinks, and (b) according to a protocol. Weik, *Communications Standard Dictionary* 203 (3 ed. 1996). A data link is the means of connecting facilities or equipment at one location to facilities or equipment at another location for the purpose of receiving the data. Weik, *Communications Standard Dictionary* 206 (3 ed. 1996). A protocol, in communications, computer, data processing, and control systems, is a set of formal conventions that govern the format and control the interactions between two communicating functional elements in order to achieve efficient and understandable communications. Weik, *Communications Standard Dictionary* 770 (3 ed. 1996).

A data communications network is the interconnection of three or more communicating entities (e.g., data sources and/or sinks) over one or more data links. Weik, *Communications Standard Dictionary* 618 (3 ed. 1996). The branch of science and technology that is devoted to the study and analyses of the configurations and properties of networks makes use of what are known as network topologies. Weik, *Communications Standard Dictionary* 622 (3 ed. 1996). A network topology is typically a graphical representation of the specific logical arrangement, from a communications standpoint, of elements in a network, irrespective of such network elements' actual physical connection. In the art and science of network topology, different networks are distinguished by their different network topologies.

In network topology, each communicating entity in a network is depicted as a graphical point, or node. These nodes are abstract representations of locations in an actual physical network at which one or more data transmission lines are interconnected. Weik, *Communications Standard Dictionary* 622 (3 ed. 1996).

There are multitudinous known network topologies (e.g. mesh, star, fully connected, etc., and hybrids of such known network topologies). One such well-known network topology is the star network topology, which can be utilized to illustrate a problem that exists generally in the field of data communications involving networks having nodes.

A star network topology is a radial (starlike) configuration of communications network nodes such that (a) each endpoint node is connected via a single branch directly to the central node that serves as a central distribution node, and (b) each endpoint node can communicate with any other node only via the central node and two branches. The central node serves as a distribution node to all the endpoint nodes, including the originating node, or to selected endpoint nodes, depending upon whether the central node is an active or passive node. Weik, *Communications Standard Dictionary* 625 (3 ed. 1996).

FIG. 1 illustrates a star network topology. Shown is central node 100. Connected to central node 100 are endpoint nodes 102–116. These endpoints, or end stations, are connected to central node 100 via data links 122–136, respectively. The topology of the network makes clear that all communications between endpoints must transit central node 100.

In operation, central node 100 receives packetized data (in its most generic sense packetized data typically consists of a message field, a source field indicating the source node of the packetized data, and a destination field indicating the destination node (or data sink) of the packetized data) from endpoint nodes 102–116 over their respective data links. Upon reception of such packetized data, central node 100 reads the destination field, determines which data link the packetized data must be sent over to reach the destination indicated in the destination field, and then subsequently sends the packetized data over the appropriate data link. Central node 100 must do the foregoing (receive the packetized data, read the destination field, and then transmit the packetized data over the appropriate link) for each unit of packetized data received.

It is common for several end stations to desire to communicate with other end stations virtually simultaneously. In such situations, central node 100 is called upon to read the destination fields of several different units of packetized data, and forward the packetized data unit to the appropriate destination endpoint node, all at essentially the same time.

In old-style nodes performing the function of central node 100, this function was achieved by buffering (placing in temporary storage) one or more of the packetized data units, and then processing the stored data units one at a time. Another way to state this is that the packetized data units arriving virtually simultaneously were enqueued (made to wait in line) and would only be processed (i.e., destination field read and the packets forwarded to the appropriate destination) after the packetized data units ahead of them in the queue had been processed.

This need for enqueuing arose from the fact that in old-style nodes there was only one processor (or "thinker"), and that processor could only process one packetized data unit at a time. Thus, if more than one packetized data unit appeared at central node 100 virtually simultaneously, many of such packetized data units would have to "wait their turn" until the processor was able to process them.

As network data traffic increased, it was found that such enqueuing began to result in unreasonable communication delays (i.e., the wait in line, or in the "queue," became too long for the communications needs of particular endpoint nodes to be satisfied). This excessive delay problem was alleviated by placing multiple processors in central node 100.

Placing multiple processors (or "thinkers") in central node 100, essentially gave central node 100 the ability to simultaneously process as many packetized data units as there were processors. For example, if endpoint nodes 102, 104, and 106 transmitted packetized data destined for endpoint nodes 108, 110, and 112, respectively, to central node 100 virtually simultaneously, in the old-style nodes the packetized data arriving first at central node 100 would have been read and forwarded, while the two later arrivals would have been enqueued and made to wait their turn until the single central node 100 processor was ready for them.

In the new-style nodes, if central node 100 has at least three processors, and those processors are not engaged in processing other data, the three packetized data units will be handed over to the individual processors for processing almost immediately upon reception. That is, the multiple processors in central node 100 have alleviated the wait associated with the enqueuing. Subsequent to the multiple processors within central node 100 determining where the packetized data is to go (i.e., reading the destination information), the packetized data is transmitted over the appropriate data link associated with the destination station.

While the new-style nodes incorporating multiple processors have greatly improved communications efficiency, they have also inadvertently given rise to an attendant problem. That problem is the inability to ensure that the sequence of packetized data units entering the central node on one specific data link will be preserved upon those same packetized data units exiting the central node on another specific data link (notice that old-style nodes preserved such sequence merely as a byproduct of the enqueuing). This problem can be illustrated with reference again to FIG. 1.

This problem can be illustrated with reference again to FIG. 1. Assume the endpoint node 104 transmits four packetized data units in sequence to be delivered to endpoint node 116. Assume also that central node 100 has at least four processors. Further assume that no other stations are transmitting while endpoint 104 is transmitting.

Upon receipt of the four packetized data units through the port (entry and exit points of nodes associated with specific data links are generally referred to as "ports") of central node 100 associated with data link 124, central node 100 essentially contemporaneously delivers them to individual processors in the sequence the packetized data units were received. Now, assuming that the clock speed (a factor which influences the speed in which data can be processed by a processor) of the processor in which the third packetized data unit received is faster than those of the other three processors. As a consequence of this, assume that the processor holding the third received packetized data unit completes its processing first. Consequently, the third in received packetized data unit will be the first to be transmitted through the port of central node 100 associated with data link 136, and thus the third in sequence data packet transmitted by endpoint node 104 is the first received by destination endpoint node 116. Thus, the sequence of the packetized data units has been destroyed.

Such destruction of sequencing is a byproduct of multiple processor nodes. There are many applications, well known in the art, where such loss of sequence is unacceptable (e.g., real-time video conferencing, or real-time remote patient monitoring). However, as was noted above, since multiple processor nodes have very real benefits it is desirable to continue using them, albeit in a way that does not destroy sequencing of packetized data units.

It is apparent from the foregoing that a need exists for a method and system, which can be used with multiprocessor network nodes, and which will ensure that the sequence in which data units enter one or more specific ports of a multiple processor node is preserved when those same data units subsequently exit from the multiprocessor node. It would be further advantageous is the method and system could be implemented in new network nodes as well as retrofitted to existing network nodes.

SUMMARY OF THE INVENTION

It is therefore one object of the present invention to provide a method and system to be utilized in data communications.

It is therefore another object of the present invention to provide a method and system to be utilized in data communications involving at least one data communications network.

It is yet still anther object of the invention to provide a method and system to be utilized in data communications involving at least one data communications network having at least one multiprocessor network node.

The foregoing objects are achieved as is now described. Provided are a method and system for preserving sequencing of data units transiting a network node having multiple ports and multiple processor subsystems. The method and system accomplish their objectives via the following. A sequence in which two or more of the data units enter the network node, via a specific one of the multiple ports, is recorded. And, the two or more of the data units are transmitted from the network node according to the recorded sequence. The method and system achieve the recording of sequence via the following. In response to an insertion of one of the two or more data units into a specific one of the multiple processor subsystems, the specific one of the multiple processor subsystems is associated with a specific one of the multiple ports by which the one of the two or more data units entered the network node, and any other of the multiple processor subsystems that are currently processing on any other of the two or more data units that entered the network node through the specific one of the multiple ports is noted. Thereafter, any request to transmit by the specific one of the multiple processors is honored if it is determined that the data unit with the requesting processor is next according to the recorded sequence. The data unit is determined to be next in sequence if all of the multiple processors, that were processing on other data units which entered through the specific one of the multiple ports, have completed processing. The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
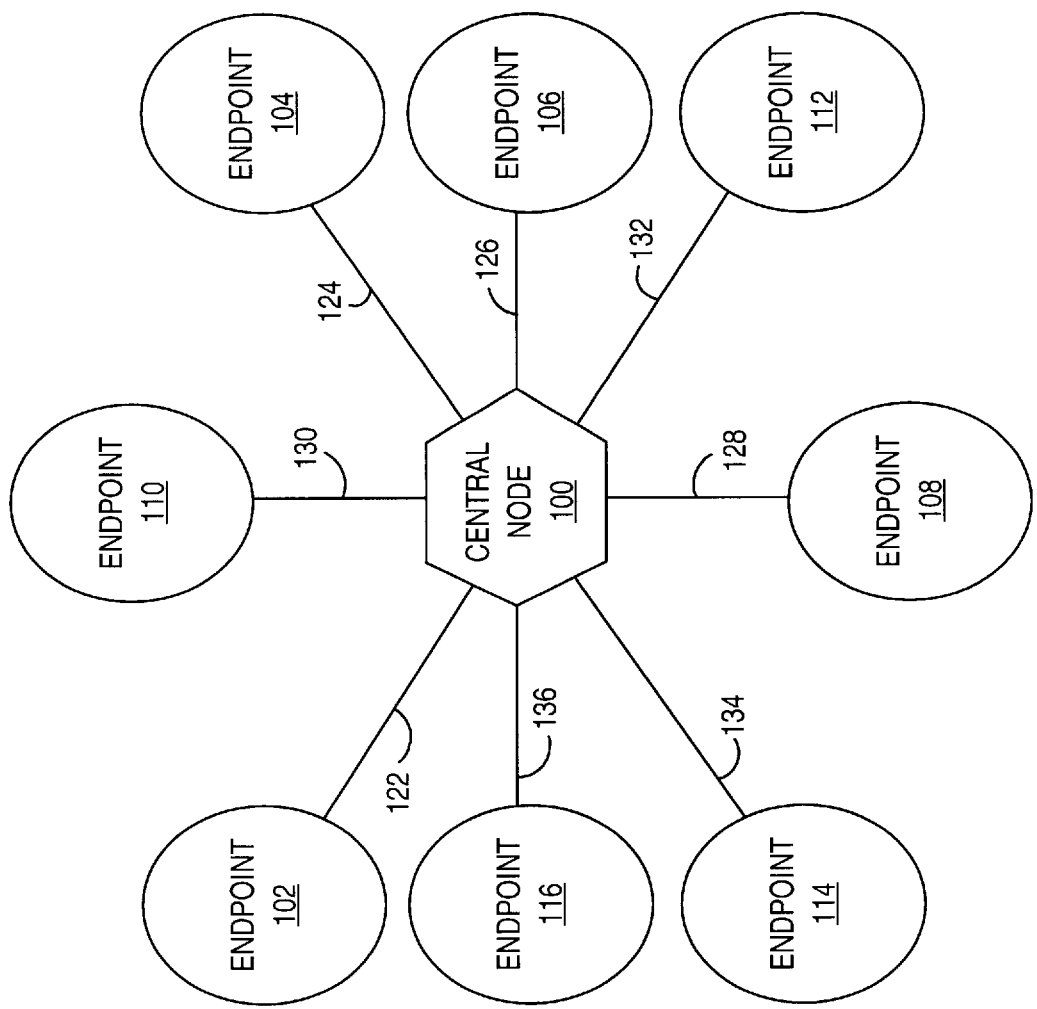
FIG. 1 illustrates a star network topology.

In the following detailed description, like parts are indicated by like numbers. Furthermore, the first digit of each reference numeral generally relates to the figure wherein the primary description of that reference numeral appears. For example, 1xx would have its primary description in relation to FIG. 1, 2xx in relation to FIG. 2, 3xx in relation to FIG. 3, and so forth.

Also in the following discussion, it will be understood by those skilled in the art that each functional unit introduced and discussed could be implemented in software, in hardware, in firmware, or in any combination of the foregoing, depending upon the preference of the implementer.

Figure 2A:
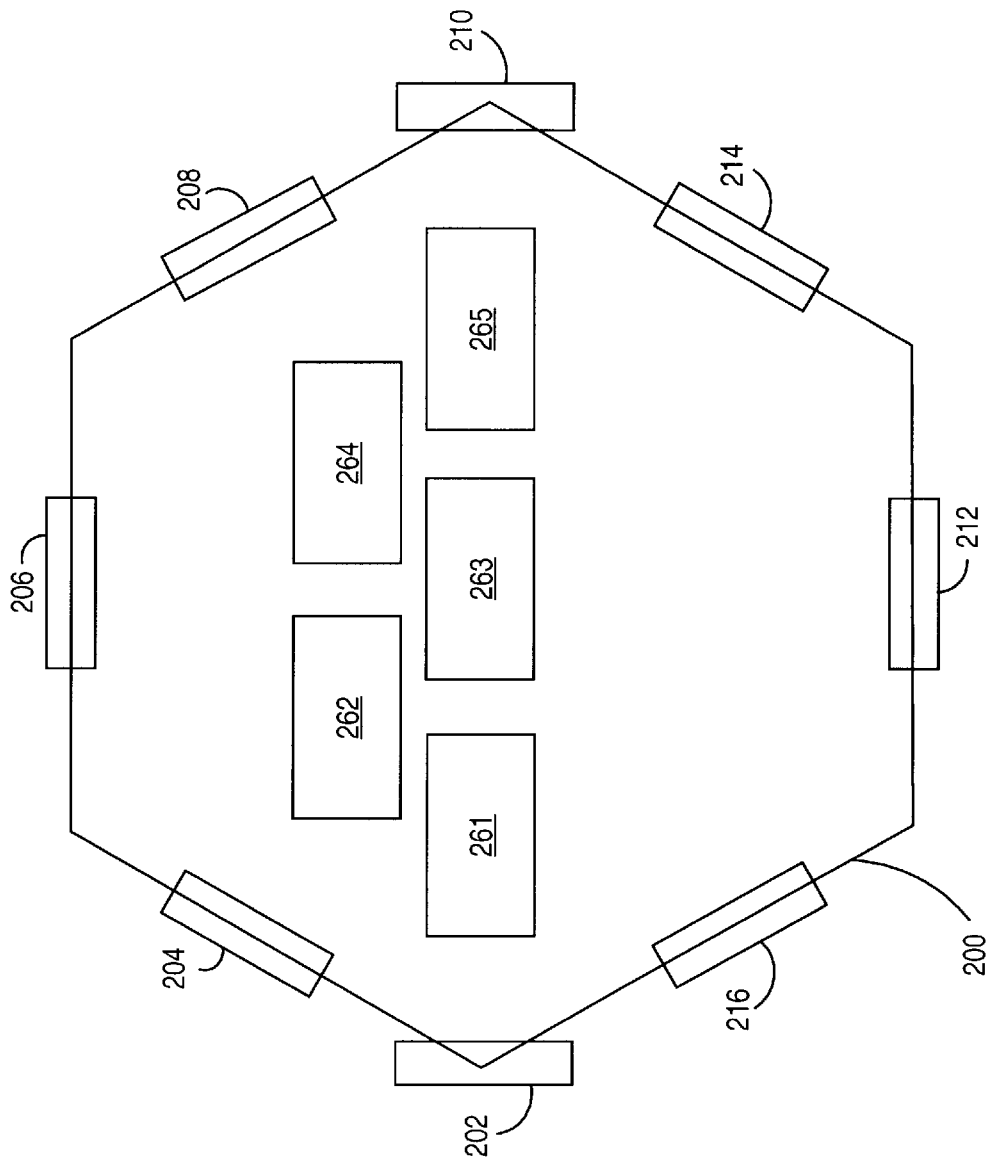
FIG. 2A illustrates one embodiment of a multiprocessor network node constructed in accordance with the present invention.

Refer now to FIG. 2A, which illustrates one embodiment of a multiprocessor network node constructed in accordance with the present invention. Shown in FIG. 2A is network node 200 having ports 202–216. Also shown is that network node 200 is a multiple processor node in that internal to it are five (those skilled in the art will appreciate that the use of five processors is merely illustrative and is used merely for the sake of ease of understanding, and that in fact any n (where n is some positive integer) processors may in fact be present) processor subsystems 261, 262, 263, 264, and 265.

Figure 2B:
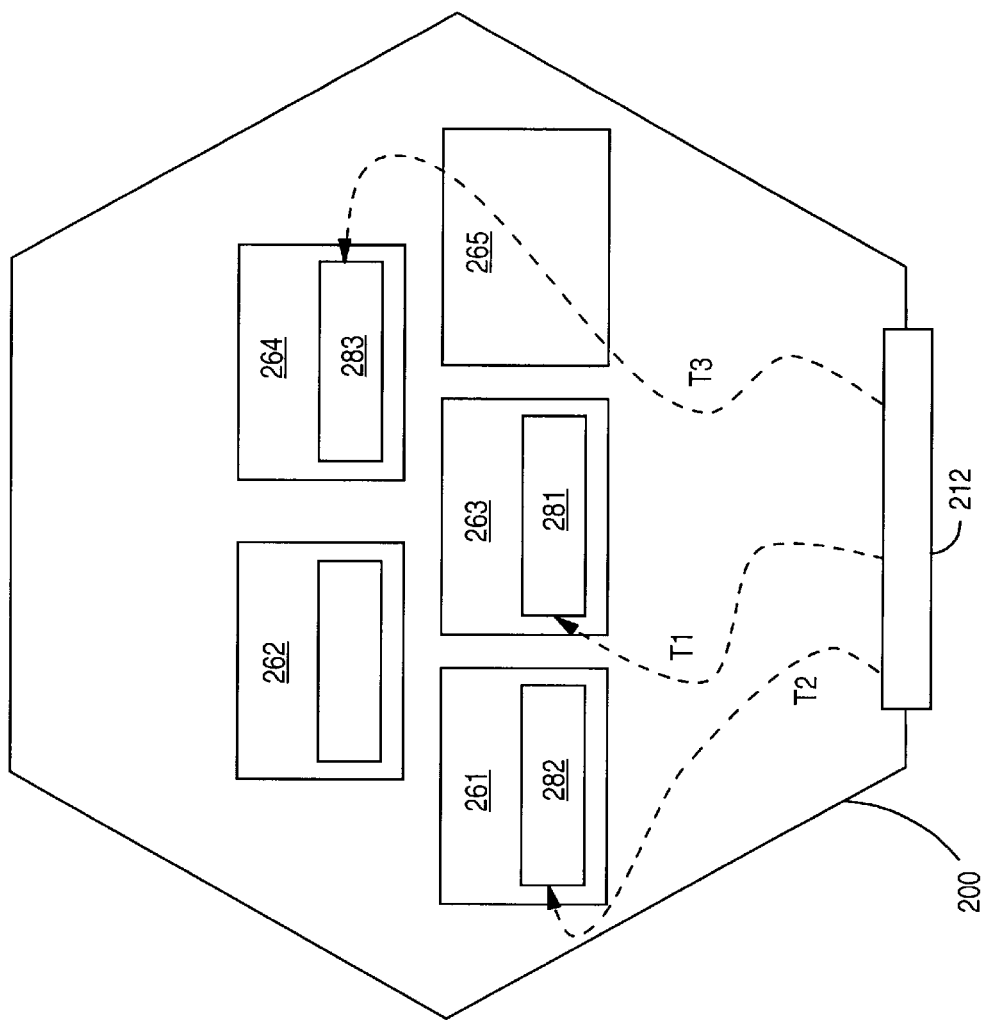
FIG. 2B illustrates three data packets being sequentially received and placed into subsystem processors.

Refer now to FIG. 2B, which shows (1) that at a time t1, first packetized data unit 281 enters network node 200 via port 212 and that first packetized data unit 281 is substantially simultaneously placed in processor subsystem 263; (2) that at a time t2 subsequent to time t1, a second packetized data unit 282 enters network node 200 via port 212 and that second packetized data unit 282 is substantially simultaneously placed in processor subsystem 261; and (3) that at a time t3 subsequent to time t2, a third packetized data unit 283 enters network node 200 via port 212 and that third packetized data unit 283 is substantially simultaneously placed in processor subsystem 264.

As has been discussed, there is no guarantee that processor subsystem 263 processing first packetized data unit 281 will complete processing first. Consequently, there is no guarantee that the sequence in which first, second, and third packetized data units 281, 282, and 283 entered network node 200 will be preserved absent the present invention. The following figures set forth a method and system that will assure that such sequence is preserved.

Figures 1, 3A:
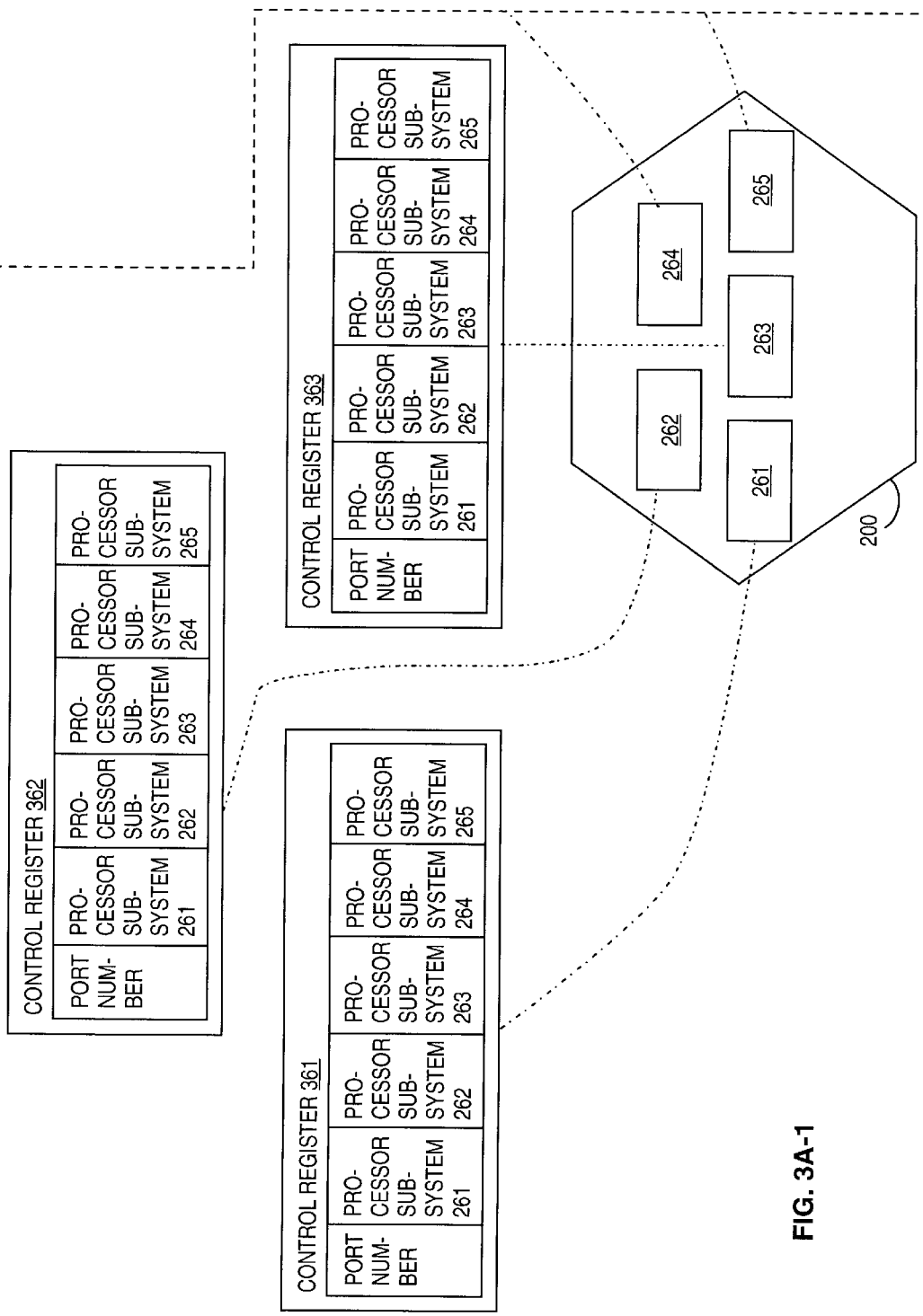
FIGS. 3A and 3B are partially schematic diagrams that depict, in broad overview, how the method and system of the present invention ensure that sequencing is preserved.
Figures 2, 3A:
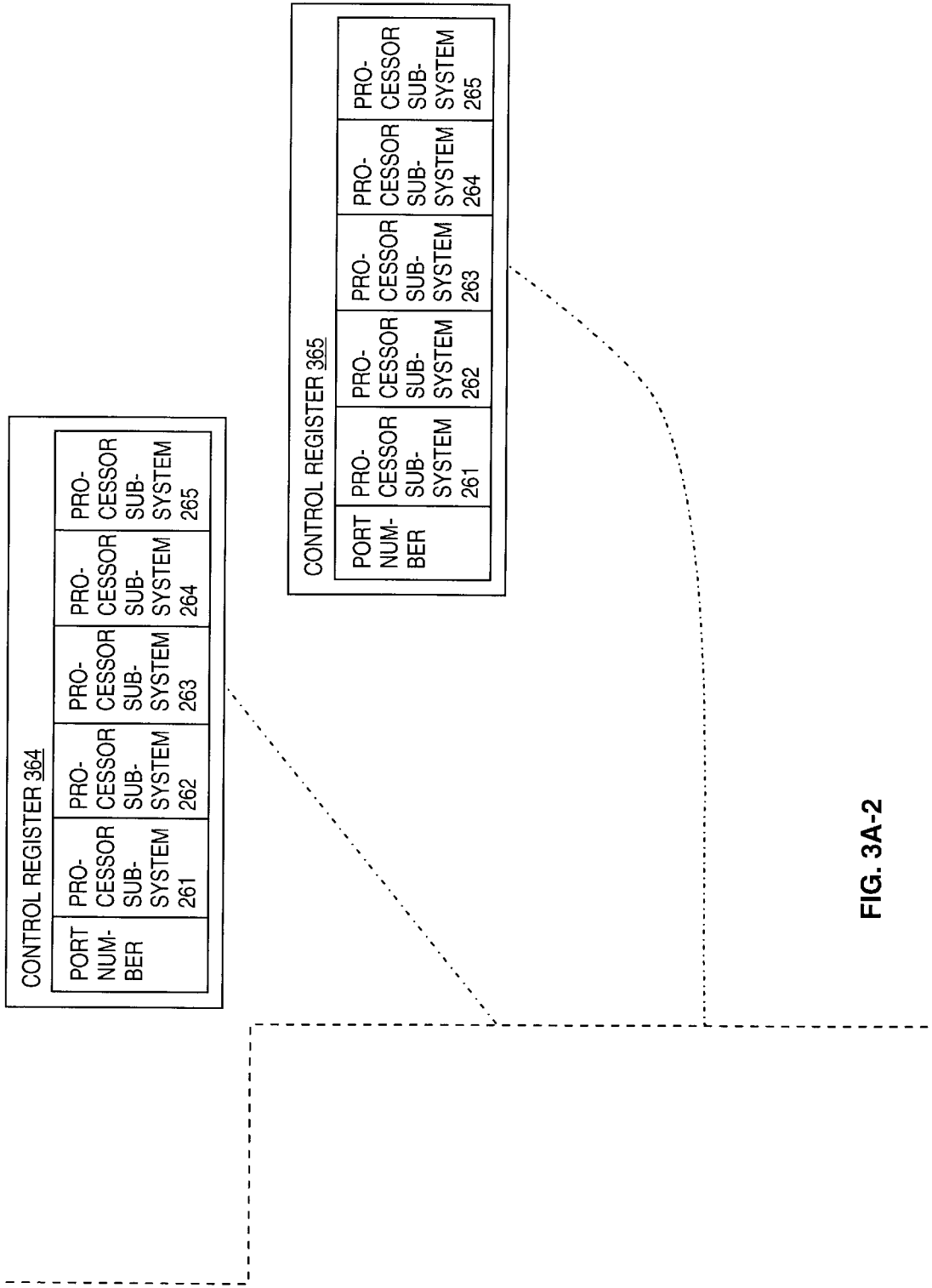
Figures 1, 3B:
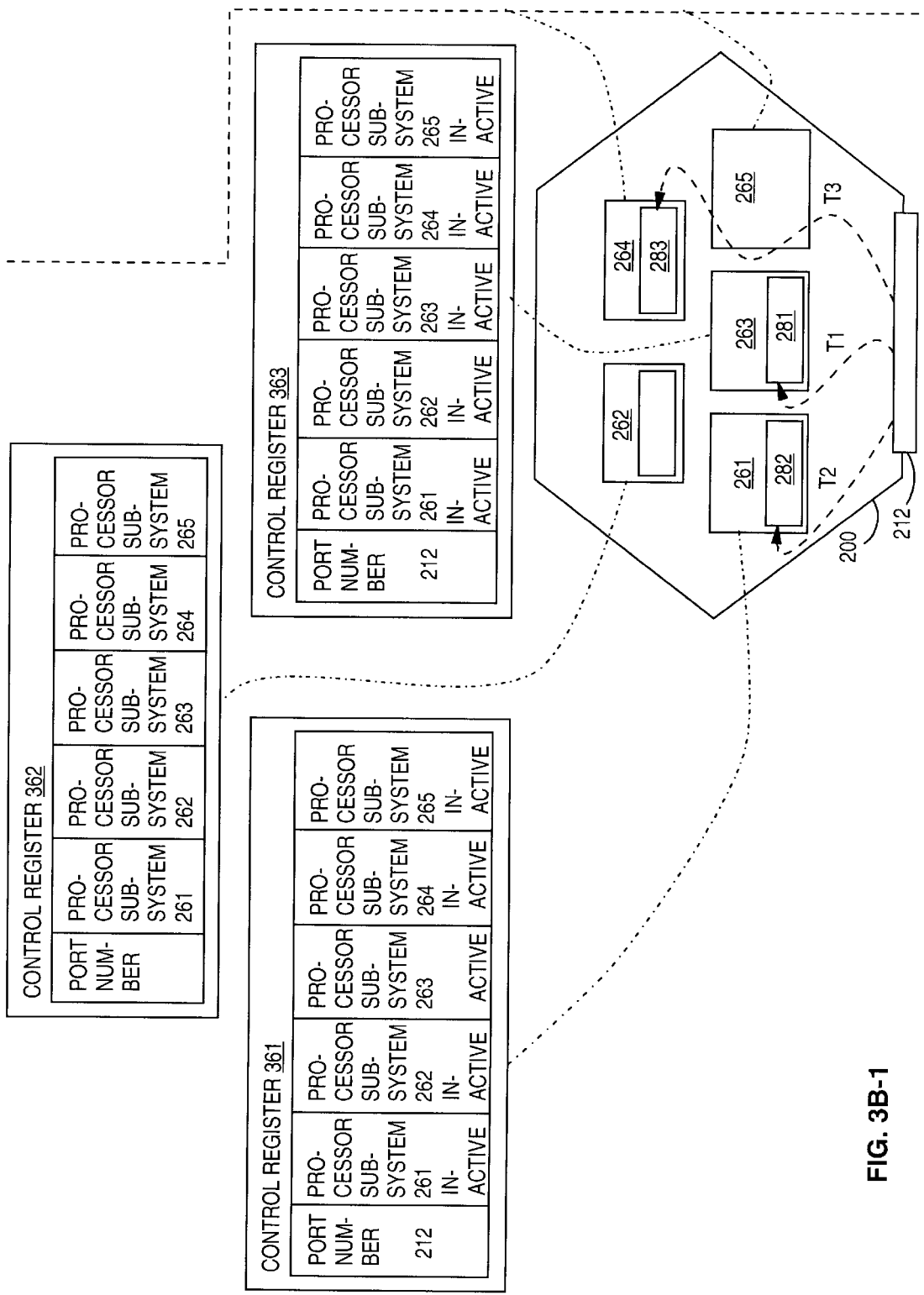
Figures 2, 3B:
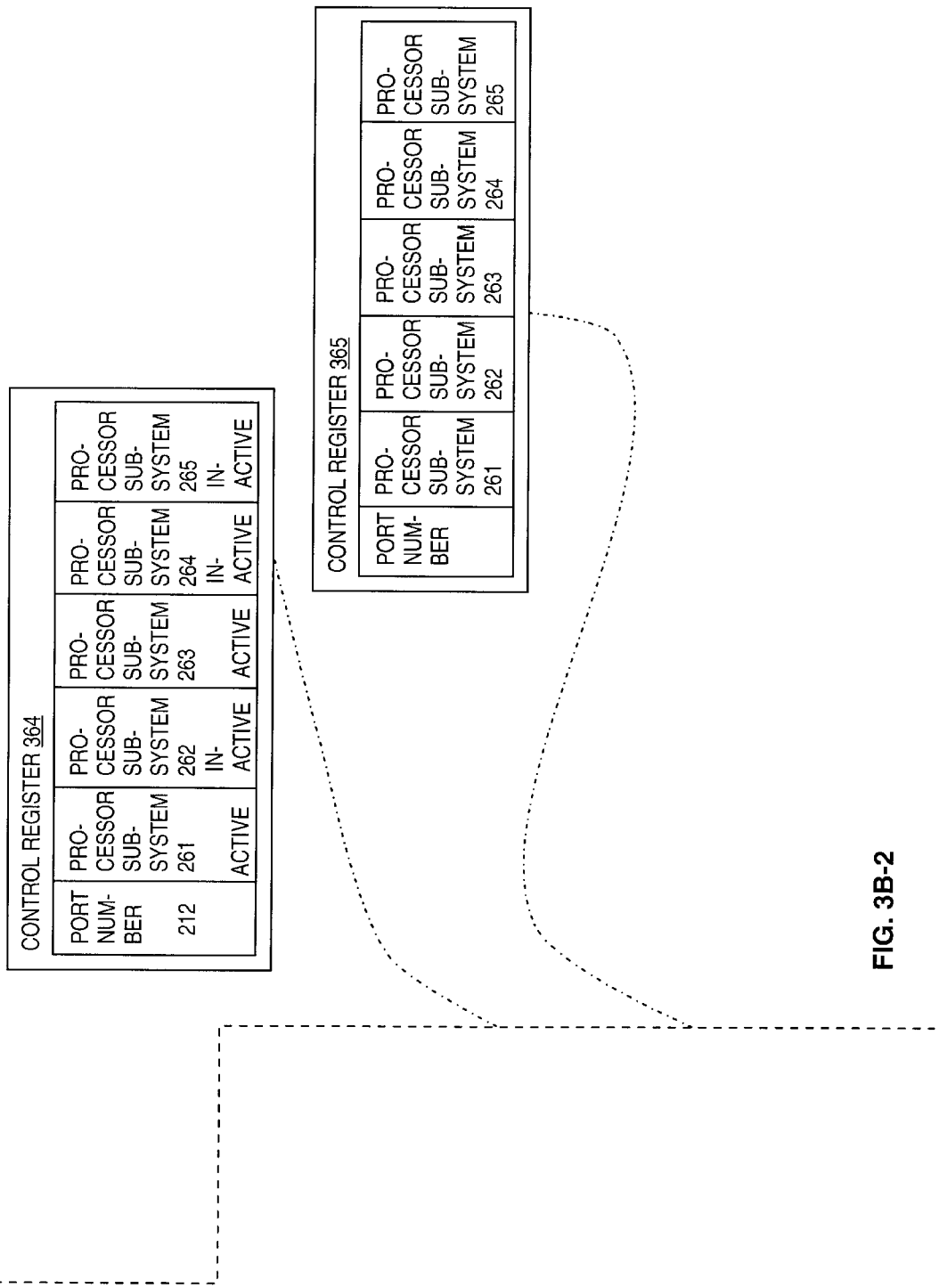

Refer now to FIGS. 3A and 3B, which are partially schematic diagrams that depict, in broad overview, how the method and system of the present invention ensure that sequencing is preserved. FIG. 3A incorporates elements of FIG. 2A, and like parts are denoted by like numbers. Shown in FIG. 3A is network node 200 with its five processor subsystems 261, 262, 263, 264, and 265.

Depicted in FIG. 3A is that each individual Processor Subsystem 261, 262, 263, 264, and 265 has associated with it a specific control register 361, 362, 363, 364, and, 365. Each individual control register has associated with it a port number field, and five (one for each processor in the node) processor subsystem fields (each individual processor subsystem field has two states, active and inactive, which, if set to "active" indicates that the processor subsystem associated with the field is actively processing a data element received via the port number currently occupying the Port Number Field). It will be understood by those skilled in the art that each control register could be virtually any type of data structure, and that the control register data structures set forth herein are merely illustrative.

Refer now to FIG. 3B. FIG. 3B incorporates elements of FIGS. 2B and 3A, and like parts are denoted by like numbers. FIG. 3B depicts that (1) essentially simultaneously with first packetized data unit 281 being placed in processor subsystem 263, port number 212 is written into control register 363 port number field, and that since no other processor subsystems are processing any data units received through port 212, the processor subsystem fields of control register 363 are all set to "inactive"; (2) essentially simultaneously with second packetized data unit 282 being placed in processor subsystem 261, port number 212 is written into control register 361 port number field, and since processor subsystem 263 is already processing data that was received via port number 212, the processing subsystem 263 field of control register 361 is set to "active"; and (3) essentially simultaneously with a third packetized data unit 283 being placed in processor subsystem 264, port number 212 is written into control register 364, and since processor subsystems 261 and 263 are currently processing data that was received via port number 212, the processing subsystem 261 field and the processing subsystem 263 field of control register 364 are set to "active."

Refer now to FIGS. 4A, 4B, 4C, 4D and 4E which illustrate how the control registers 361–365 depicted in FIGS. 3A and 3B can be utilized to ensure that packetized data units entering a node in sequence via a particular port leave the node in the sequence in which those packetized data units entered the node. FIGS. 4A, 4B, 4C, 4D and 4E will be utilized to illustrate events subsequent to the three processor subsystems (PSS) 261, 263, and 264 being loaded with packetized data units as was discussed in relation to FIGS. 3A and 3B.

Shown in FIGS. 4A, 4B, 4C, 4D, and 4E are control registers 361–365 associated with transmit request control logics 451–455, and transmit clear control logic 480 that is connected to each control register 361–365. Assume that the processor subsystem 261 completed first, and consequently that processor subsystem 261 sends request-to-transmit 400 to transmit request control logic 451. Upon receipt of request-to-transmit 400 by transmit request control logic 451, transmit request control logic 451 examines the processor subsystem fields of control register 361 (which is associated with processor subsystem 261). If any of the processor subsystem fields in control register 361 have been set to "active," which in one illustrative embodiment equates to setting a one-bit field to logical 1, transmit request control logic 451 initially ignores, or denies, request-to-transmit 400, since the fact that any processor subsystem field is set active is indicative of the fact that another packetized data unit, received via port 212, was already being processed when the packetized data unit was placed into processor subsystem 261. As can be seen from FIG. 4A, request-to-transmit 400 from processor subsystem 261 will be ignored because control register 361 has its processor subsystem 263 field set to "active."

Figure 4A:
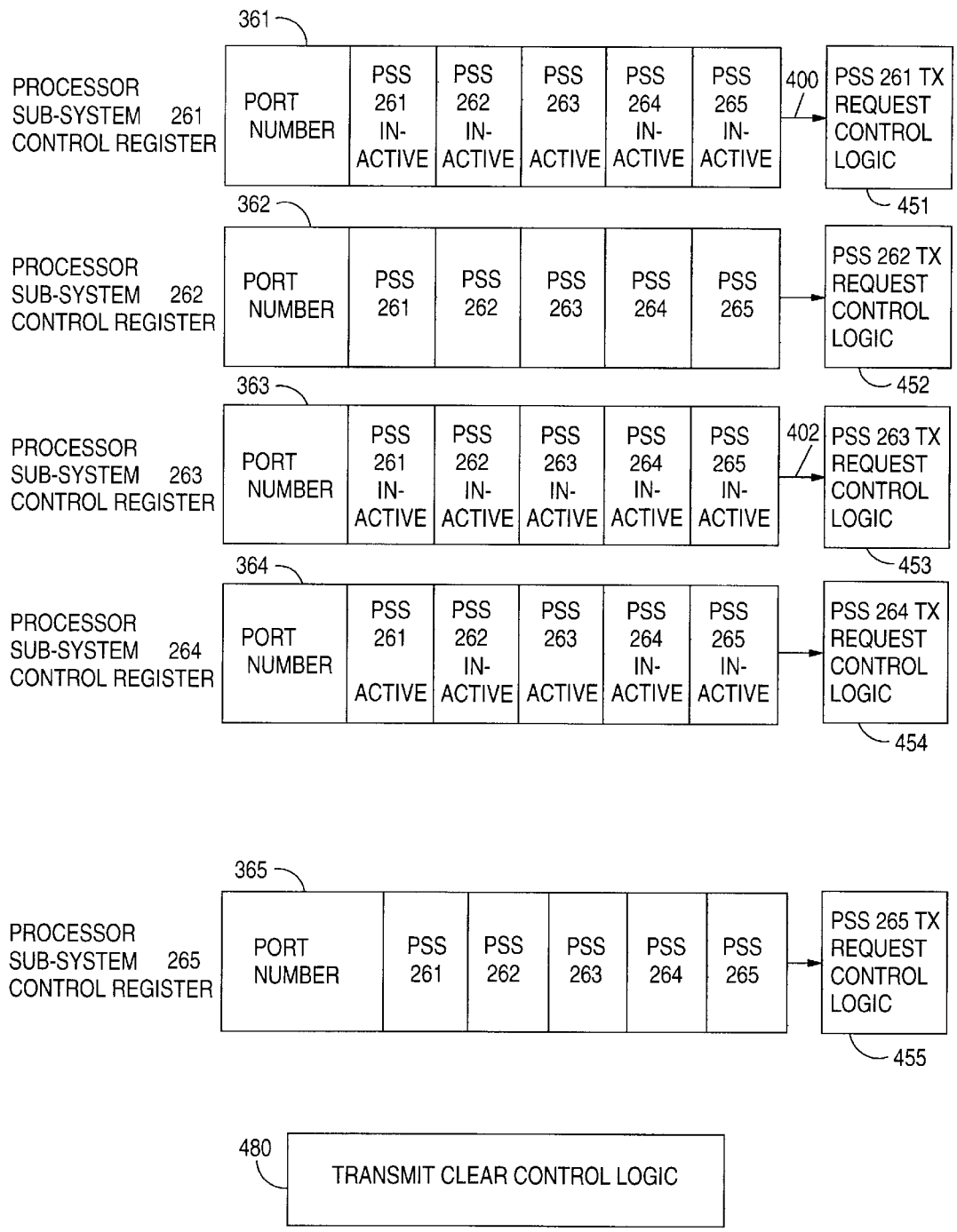
FIGS. 4A, 4B, 4C, 4D and 4E illustrates how the control registers 361–365 depicted in FIGS. 3A and 3B can be utilized to ensure that packetized data units entering a node in sequence via a particular port leave the node in the sequence in which those packetized data units entered the node.

Assume that subsequent to the foregoing, processor subsystem 263 completes its processing, and consequently processor subsystem 263 sends request-to-transmit 402 to transmit request control logic 453. Upon receipt of request-to-transmit 402, transmit request control logic 453 examines the processor subsystem fields of control register 363 (which is associated with processor subsystem 263). As can be seen in FIG. 4A, none of the processor subsystem fields of control register 363 have been set to "active," since processor subsystem 263 was actually the processor subsystem within network node 200 (not shown) that is processing the oldest (or earlier in sequence) packetized data unit received via port 212 that is still resident within network node 200 (not shown). Consequently, transmit request control logic 454 grants request-to-transmit 402, since the fact that no processor subsystem fields in control register 363 are set active is indicative of the fact that the packetized data unit in control register 363 should be the first transmitted out of network node 200.

Figure 4B:
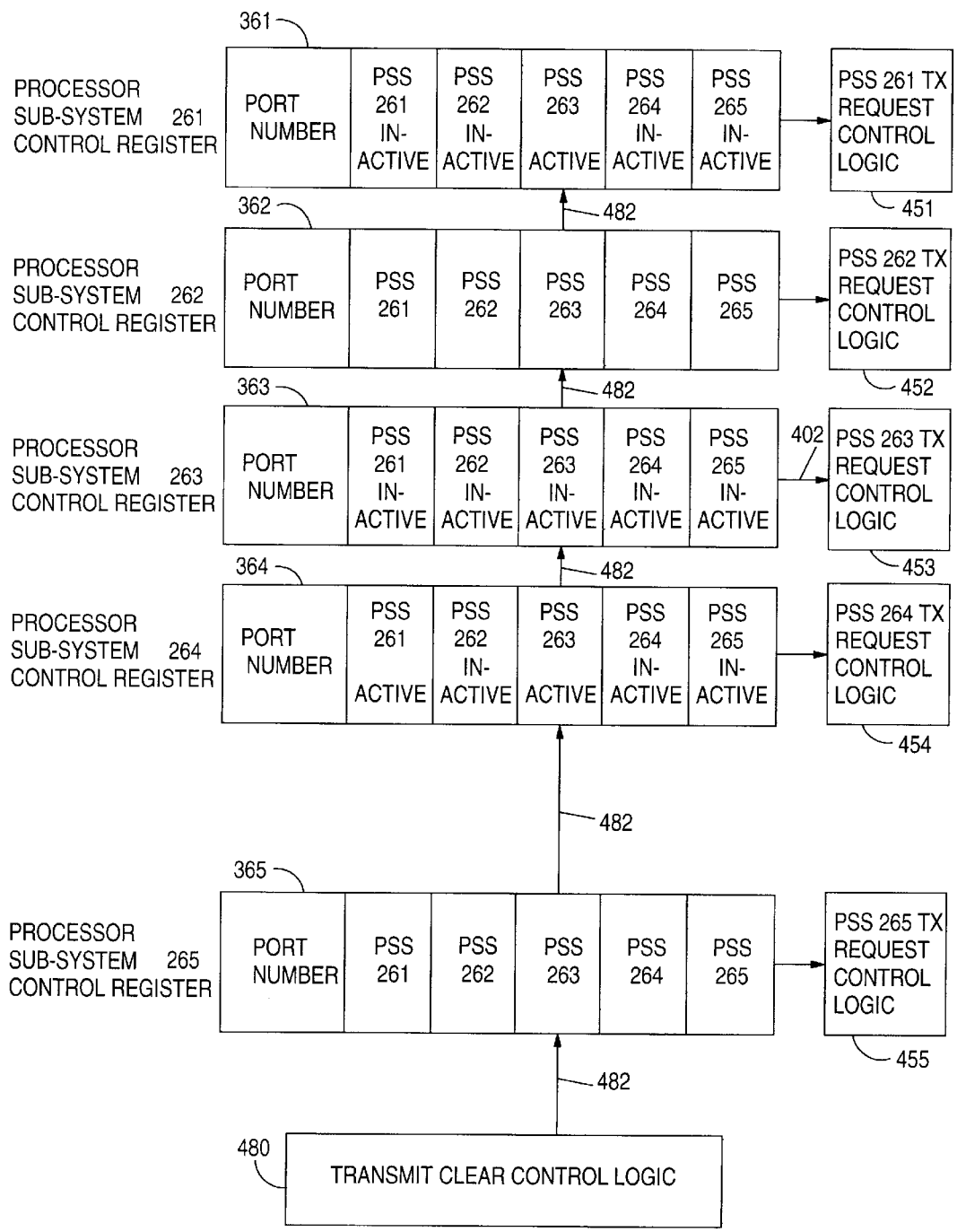

Refer now to FIG. 4B. FIG. 4B depicts that virtually immediately subsequent to (e.g., on a next clock cycle) transmit request control logic 453 granting request-to-transmit 402, as was discussed in relation to FIG. 4A, in response to notification by transmit control logic 453 that request-to-transmit 402 has been granted, transmit clear control logic 480 sends "Set Processor Subsystem 263 Field to 'Inactive' Message" 482 to each and every control register 361–365.

Figure 4C:
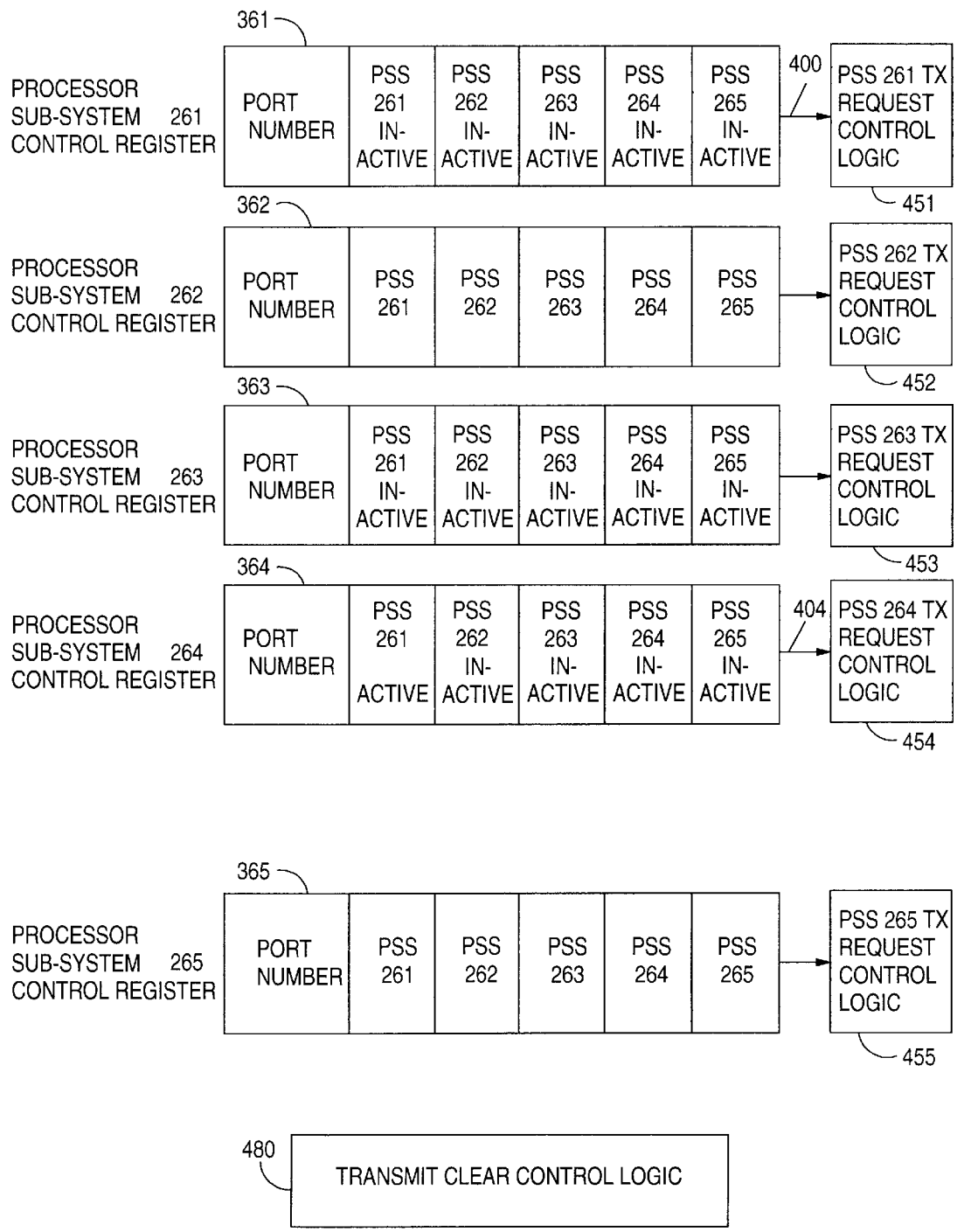

Refer now to FIG. 4C. FIG. 4C illustrates the state of Control Registers 361–365 subsequent to "Set Processor Subsystem 263 Field to 'Inactive' Message" 482, as was discussed in relation to FIG. 4B, being received and acted upon by control registers 361–365. As can be seen from FIG. 4C, subsequent to the foregoing, control registers 261 and 264 have their processor subsystem 263 Fields set to "inactive."

Assume now that subsequent to the foregoing, Processor Subsystem 264 completes its processing, and consequently that Processor Subsystem 264 sends request-to-transmit 404 to transmit request control logic 454. Upon receipt of request-to-transmit 404, by transmit request control logic 454 examines the processor subsystem fields of control register 364 (which, it should be recalled, is associated with processor subsystem 264). As can be seen from FIG. 4C, the processor subsystem 261 Field has been set to "active." Consequently, transmit request control logic 454 initially ignores request-to-transmit 404, since the fact that processor subsystem 261 field is set active is indicative of the fact that another packetized data unit, received via port 212, was already being processed by processor subsystem 261 when third packetized data unit 283 was placed into processor subsystem 264.

Assume that subsequent to the foregoing, processor subsystem's 261 previous request-to-transmit 400 is re-examined (such re-examination is typically engaged in after a frame is transmitted from the node) by transmit request control logic 451. Upon this re-examination transmit request control logic 451 examines the processor subsystem fields of control register 361 (which is associated with processor subsystem 263). As can be seen in FIG. 4C, none of the processor subsystem fields of control register 361 are set to "active," since Processor Subsystem 261 is actually the processor subsystem within network node 200 (not shown) that is processing the oldest (or first in sequence) packetized data unit received via port 212 that is still resident within network node 200 (not shown). Consequently, transmit request control logic 451 grants request-to-transmit 400, since the fact that no processor subsystem fields in control register 361 are set "active" is indicative of the fact that second packetized data unit 282 in processor subsystem 261 is to be the next transmitted out of the node.

Figure 4D:
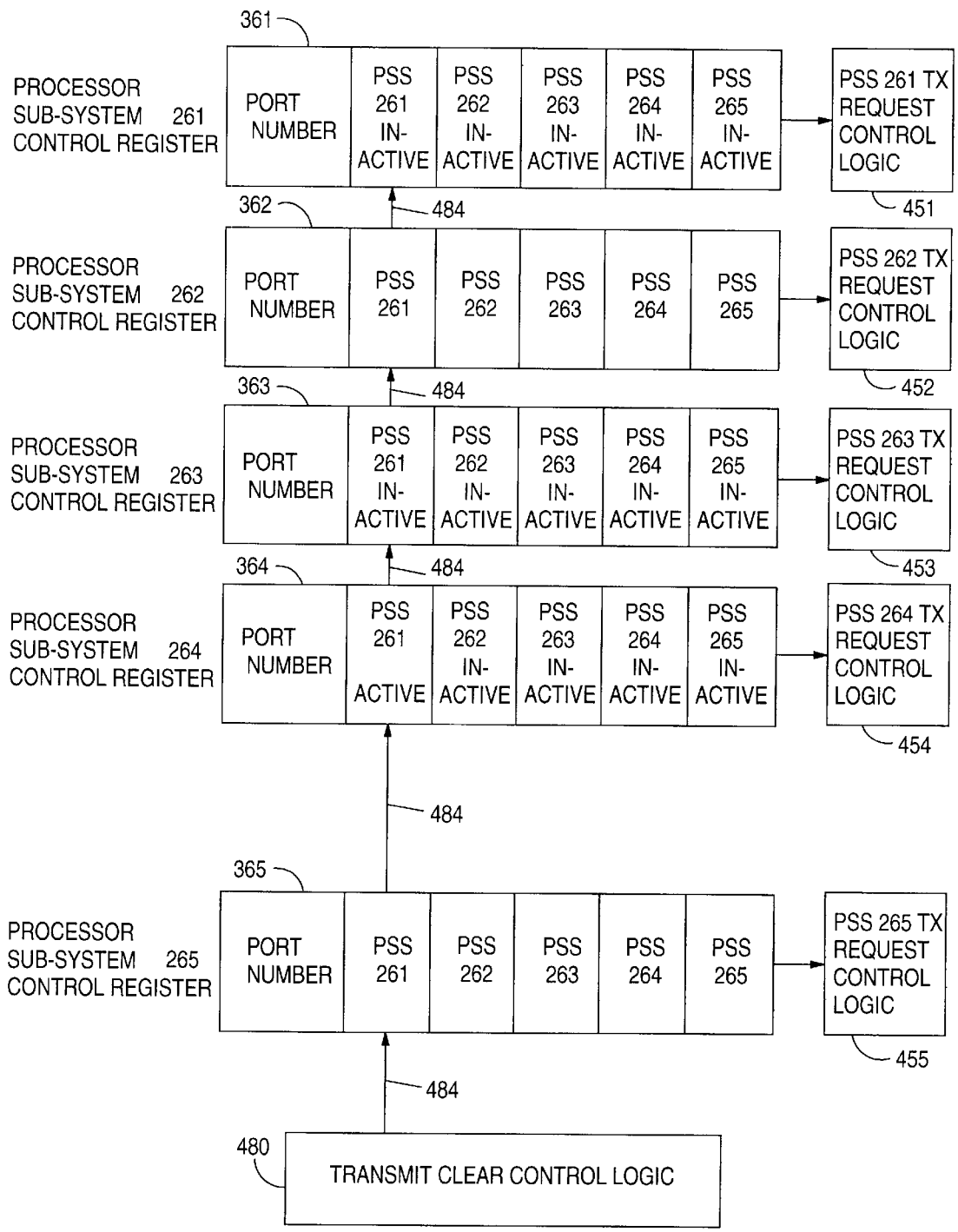

Refer now to FIG. 4D. FIG. 4D depicts that virtually immediately subsequent to (e.g., upon a next clock cycle) transmit request control logic 451 granting request-to-transmit 406, as was discussed in relation to FIG. 4C, in response to notification by transmit control logic 451 that request-to-transmit 406 has been granted, transmit clear control logic 480 sends "Set Processor Subsystem 261 Field to 'Inactive' Message" 484 to each and every control register 361–365.

Figure 4E:
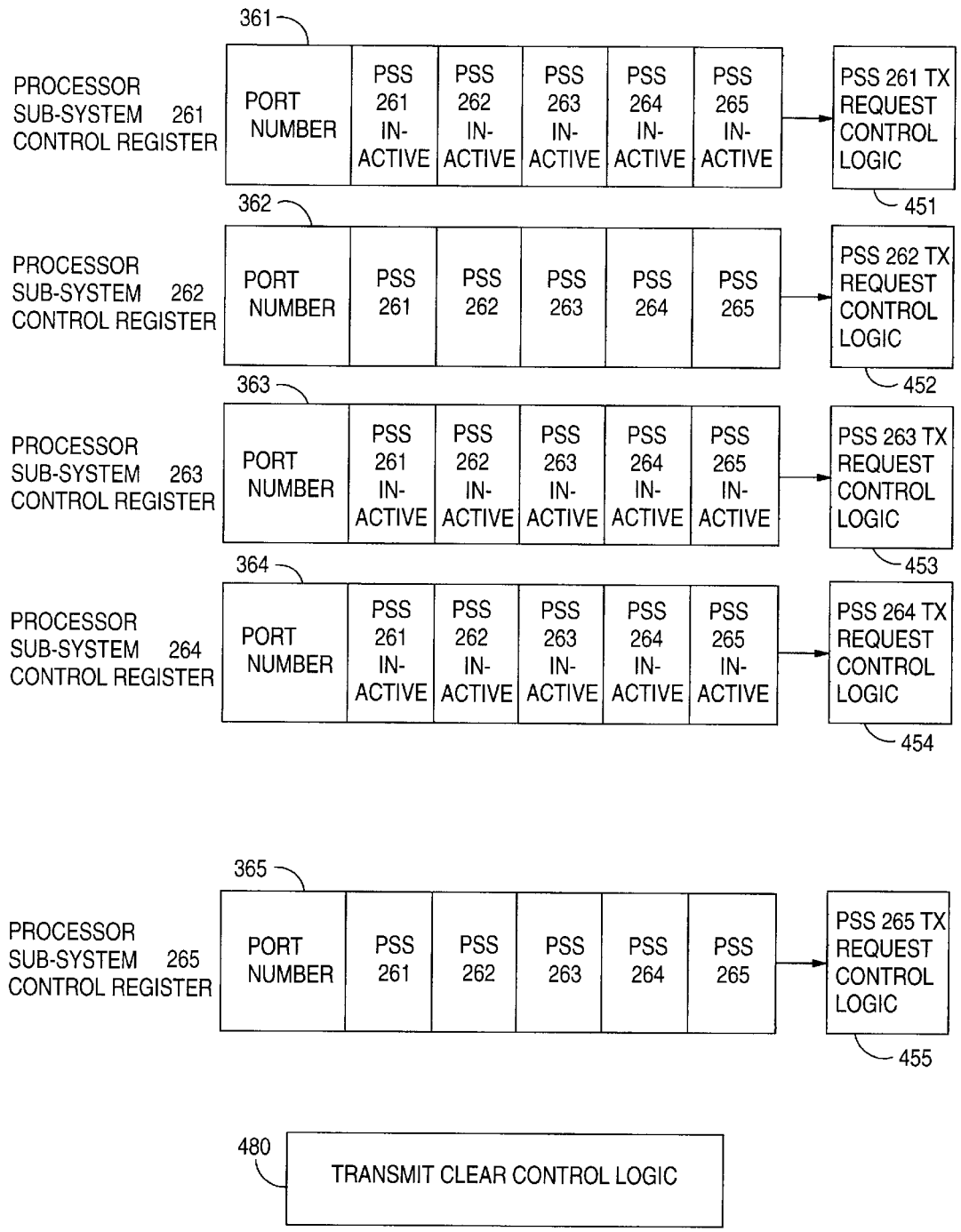

Refer now to FIG. 4E. FIG. 4E illustrates the state of control registers 361–365 subsequent to "Set Processor Subsystem 261 Field to 'Inactive' Message" 484, as was discussed in relation to FIG. 4D, being received and acted upon by control registers 361–365. As can be seen from FIG. 4C, subsequent to the foregoing, control registers 361–365 have had their process subsystem 261 fields set to "inactive." Thus, when transmit request control logic 454 re-examines processor subsystem's 264 previous request to transmit 404, that request will be granted because all of processor subsystems 261–265 fields of control register 364 have been set to "inactive."

For ease of understanding, the foregoing example only dealt with 3 processors and an essentially static situation where no new data was being received while the three packetized data units 281–283 received were being acted upon. However, those skilled in the art will recognize that the process will work as described for network nodes having n (where n is some positive integer) processor subsystems and for data being received from one or more ports on a more or less continuous basis.

Figure 5:
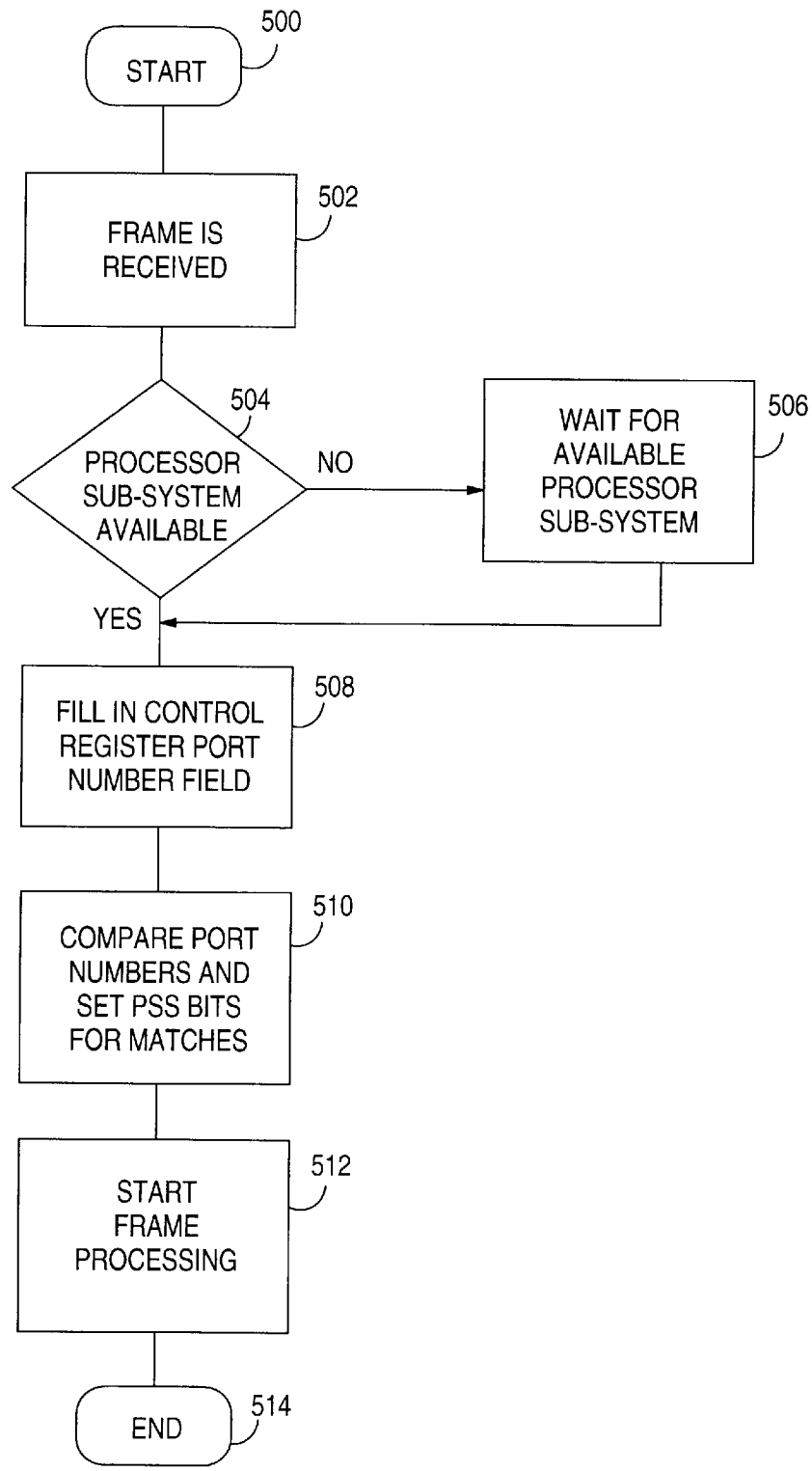
FIG. 5 depicts a high-level logic flowchart of an illustrative embodiment of a receive frame process of the present invention.

Refer now to FIG. 5. FIG. 5 depicts a high-level logic flowchart of an illustrative embodiment of a receive frame process of the present invention. Method step 500 depicts the start of the process. Method step 502 illustrates the reception of a frame (another way in which packetized data units are often described) into a multiprocessor network node. Method step 504 shows the inquiry as to whether a processor subsystem is available to process the frame. In the event that no processor subsystem is available, the process proceeds to method step 506 which depicts that the process buffers the frame and waits for one of the processor subsystems to become available.

In the event that the inquiry shown in method step 504 indicates that a processor subsystem is available, or, alternatively, when a processor subsystem becomes available subsequent to the depiction of the waiting illustrated in method step 506, the process proceeds to method step 508. Method step 508 illustrates that the port number identification field of the control register associated with the processor subsystem into which the data frame will be deposited is filled with the port number field from which the data frame was received.

Thereafter, the process proceeds to method step 510 which shows that all other active control registers are scanned for the port identification number, just written to the control register as described in method step 508, and that if such port identification is found to be associated with any other active subsystem processors, then the processor subsystem fields of those other currently active subsystem processors are set to "active" within the current control register.

Thereafter, the process proceeds to method step 512, which depicts that the data frame is thereafter delivered to the processor subsystem that was found to be available, and whose port identification number was written to the control register associated with such available processor subsystem, as was discussed in relation to method steps 504–508. Method step 514 illustrates the end of the process.

Figure 6:
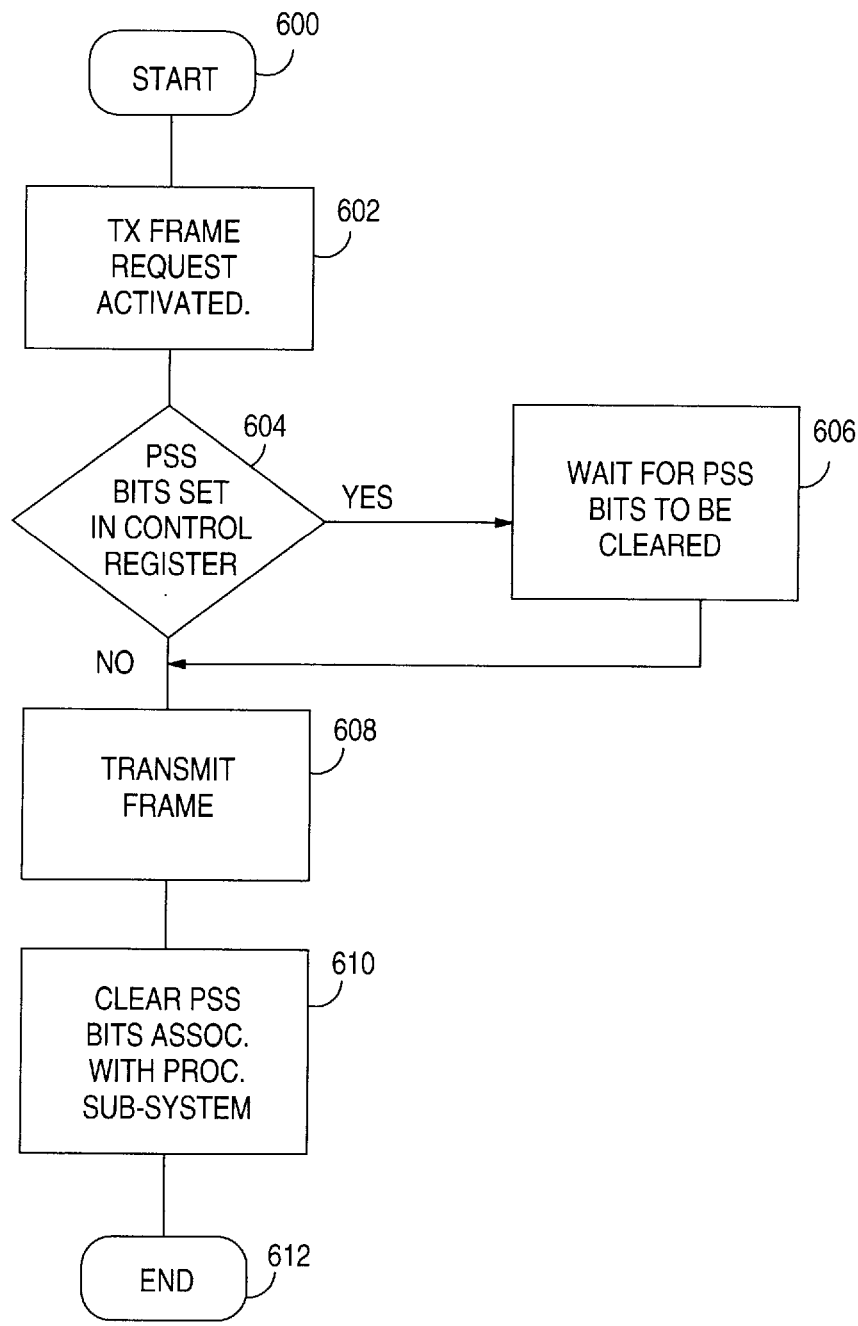
FIG. 6 depicts a high-level logic flowchart of an illustrative embodiment of a transmit frame process of the present invention.

Refer now to FIG. 6. FIG. 6 depicts a high-level logic flowchart of an illustrative embodiment of a transmit frame process of the present invention. Method step 600 illustrates the start of the process. Method step 602 shows the reception of the transmit frame request by a processor subsystem transmit control logic unit (FIG. 6 shows transmit frame requests drawn from control registers associated with a processor subsystem for the sake of clarity, but it is to be understood that requests to transmit referred to in relation to FIG. 6 actually originate from specific processor subsystems). Method step 604 depicts that in response to this request, the processor subsystem transmit control logic examines the control register associated with the processor subsystem making the request, and determines whether any of the processor subsystem fields of that control register are set as "active" (which would indicate that another frame should be sent out prior to the frame held in the processor subsystem making the request).

If the processor subsystem transmit control logic unit determines that any of the processor subsystem fields of the control register associated with the processor subsystem making the request are set to "active," then, as is depicted in method step 606, the transmit request is not honored, and instead the processor subsystem transmit control logic unit does not respond to the transmit request until all processor subsystem fields of the control register associated with the processor subsystem making the request are set to "inactive."

When it is determined that none of the processor subsystem fields of the control register associated with the processor subsystem making the request are set to "active," then the process proceeds to method step 608, wherein it is shown that the frame in the processor subsystem making the request-to-transmit is honored, and thus that such frame is transmitted.

Subsequent to transmission of the frame, method step 610 depicts that a transmit clear control logic unit clears all processor subsystem fields, associated with the processor subsystem whose request was just honored, in all control registers. Thereafter, method step 612 shows the end of the process.

Figure 7:
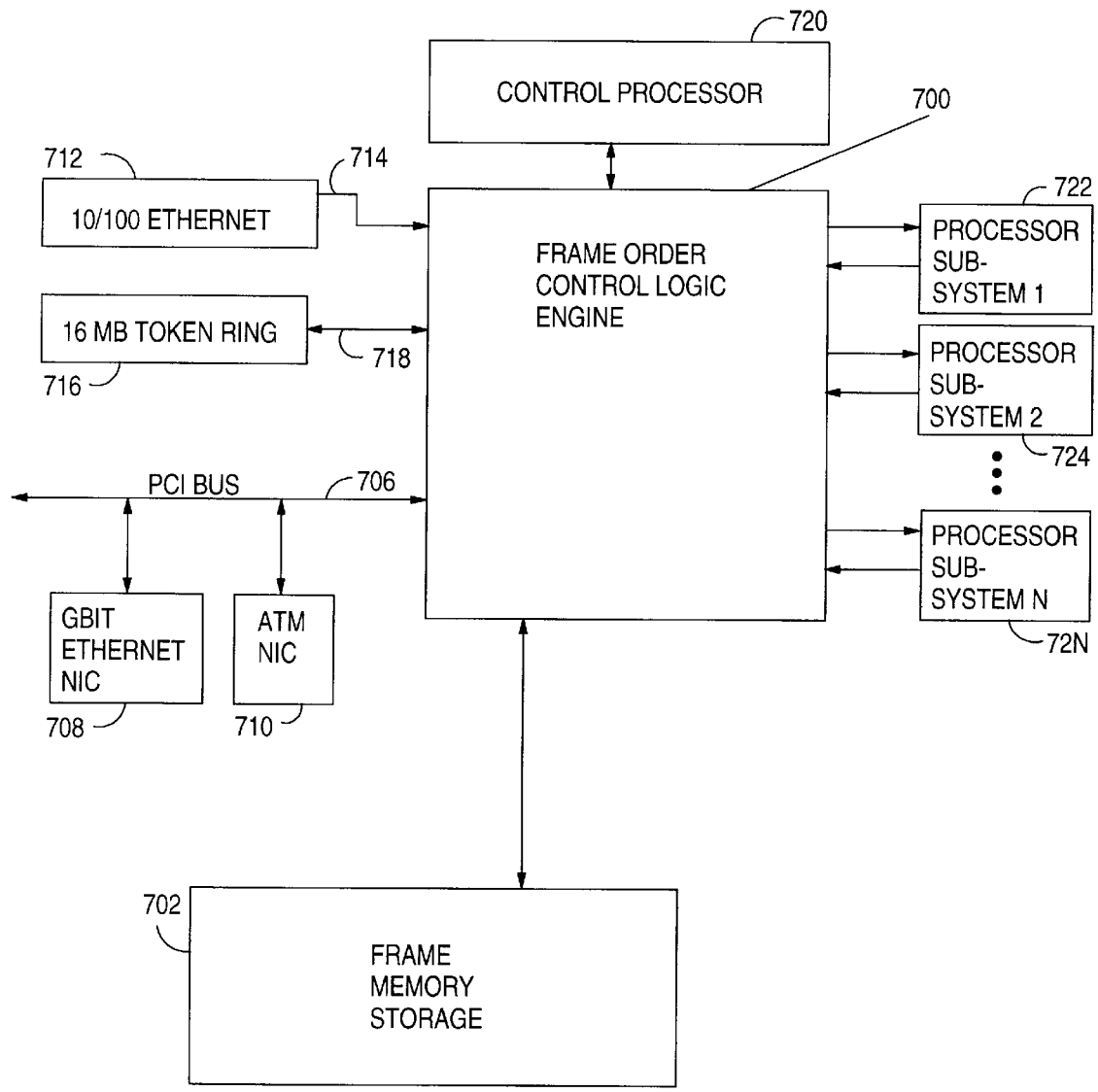
FIG. 7 depicts a high-level block diagram of a communication system for implementing an illustrative embodiment of the present invention.

Refer now to FIG. 7. FIG. 7 is a high-level block diagram of a communication system for implementing an illustrative embodiment of the present invention. Depicted in FIG. 7 is frame order control logic engine 700, which can be implemented in an application specific integrated circuit (ASIC) by utilizing hardware description language (HDL) in a manner well known to those within the art; also shown is frame memory storage 702, which can be implemented with any of a number of storage devices (such as DRAM) well known to those within the art. (Frame order control logic engine 700 is a sub-component of a larger ASIC known as a hardware routing assist engine "not shown"; however, from the standpoint of the present invention primarily the function of the frame order control logic engine 700 is relevant and consequently only will be discussed here.) All functionality and activities of the preceding discussed Figures and Flowcharts 2–6 are implemented in frame order control logic engine 700 by state machines acting in conjunction with frame memory storage 702 and processor sub-systems 722–72N (where N is any positive integer greater than 2).

Connected to frame order control logic engine 700 is PCI (peripheral component interconnect) bus 706 which has slots to accept giga-bit ethernet network interface card 708 and ATM (asynchronous transfer mode) network interface card 710, also shown in FIG. 7 is 10/100 ethernet 712 which connects to frame order control logic engine 700 via bus 714 and 16 mega-bit token ring 716 which connects to frame order control logic engine 700 via bus 718. Also shown is control processor 720 (which could be implemented via use of any number of processors, such as a microprocessor, well known to those within the art) is connected to and controls the operation of frame order control logic engine 700. As can be seen from FIG. 7, frame order control logic engine 700, under the control of control processor 720, receives data frames on different ports. For example, frame order control logic engine 700 receives giga-bit ethernet protocol data frames from giga-bit ethernet network interface card 708 via PCI bus 706 (the entry point into frame order control logic engine can be thought of here as a port through which data enters frame order control logic engine 700). Frame order control logic engine 700 also receives ATM protocol frames from ATM network interface card 710 via PCI bus 706, via the same port. In addition, frame order control logic engine 700 receives 10/100 ethernet protocol data frames via bus 714 through a data port associated with bus 714. And, frame order control logic engine 700 receives 16 mega-bit token ring protocol data frames via bus 718 through a port associated with bus 718.

Frame order control logic engine contains components sufficient to do the operation discussed previously; that is, to place received data frames into any open processor subsystems 722–72N. As is apparent from FIG. 7 in the absence of the present invention, it would be very difficult to maintain the order of data frames entering frame order control logic engine 700 from various ports in that multiple ports could be vying for its attention simultaneously and then, as has been discussed above, a processor sub-system that was subsequently loaded with a data frame could complete prior to another processor sub-system that was loaded with a data frame earlier, thereby destroying the sequence in which the data frames entered a node, should the earlier completed data frame be shipped from the node first. As has been discussed, frame order control logic engine 700, under the control of control processor 720, is able to maintain the ordering of the frames because frame order control logic engine 700 can be an ASIC designed to provide, in conjunction with frame memory storage 702, the method and system set forth in the previous data structures and flow charts such that the ordering of frames received from different ports of frame order control logic engine 700 is preserved.

While the invention has been particularly shown and described with reference to a preferred embodiment, it will be understood by those skilled in the art that various changes in form and detail may be made therein without departing from the spirit and scope of the invention. Specifically, while a hardware implementation has been described, it will be understood by those within the art that the invention can also be implemented in software, firmware or any combination of hardware, software, or firmware. Furthermore, it will also be understood by those within the art that such implementations could be embodied within program products, which include but are not limited to programs fixed in some signal bearing media such as transmission media (e.g., web pages, bulletin boards, telnet sites, etc.) or recordable media (e.g., magnetic floppy disk, digital tape, CD ROM, etc.)

What is claimed is:

1. A method for preserving sequencing of data units transiting a network node having multiple ports and multiple processor subsystems, said method comprising the steps of:

in response to an insertion of one of said two or more of said data units into a specific one of said multiple processor subsystems, associating with said specific one of said multiple processor subsystems a specific one of said multiple ports by which said one of said two or more of said data units entered said network node, noting any other of said multiple processor subsystems that are currently processing on any other of said two or more data units that entered said network node through said specific one of said multiple ports; and transmitting said two or more of said data units from said network node according to said recorded sequence.

2. The method of claim 1, wherein said step of associating comprises the step of creating a control register, having fields, for each of said multiple processor subsystems.

3. The method of claim 2, wherein said step of creating a control register, having fields, further comprises creating, for each of said multiple processor subsystems, a control register having a port identification field and one or more processor subsystem activity fields such that said processor subsystem activity fields are paired with each of said multiple processor subsystems.

4. The method of claim 2, wherein said step of noting further comprises the steps of:

in response to said insertion of said one of said two or more data units into a specific one of said multiple processor subsystems, checking to see if at least one other of said multiple processor subsystems is currently processing at least one other data unit which entered said network node through said specific one of said multiple ports; and in response to a determination that at least one other of said multiple processor subsystems is currently processing at least one other data unit which entered said network node through said specific one of said multiple ports, filling at least one other field of said created control register paired with said specific one of said multiple processors with at least one indicator that said at least one other of said multiple processor subsystems is currently processing at least one other data unit which entered said network node through said specific one of said multiple ports.

5. The method of claim 1, wherein said step of transmitting further comprises the steps of:

in response to a request to transmit by said specific one of said multiple processors, honoring said transmit request if said data unit within said specific one of said multiple processors is next according to said recorded sequence.

6. The method of claim 5, wherein said step of honoring further comprises the steps of:

determining whether at least one other of said multiple processor subsystems, that was processing at least one other data unit that entered said network node through said specific one of said multiple ports, is currently processing said at least one other data unit that entered said network node through said specific one of said multiple ports; and in response to a determination that no at least one other of said multiple processor subsystems, that was processing at least one other data unit that entered said network node through said specific one of said multiple ports, is currently processing said at least one other data unit that entered said network node through said specific one of said multiple ports, honoring said request by said specific one of said multiple processor subsystems to transmit said one of said two or more of said data units from said network node; and notifying said multiple processor subsystems that said specific one of said multiple processor subsystems is no longer processing said one of said two or more data units.

7. The method of claim 6, wherein said step of notifying further comprises the step of setting all processor subsystem activity fields, paired with said specific one of said multiple processor subsystems, to inactive.

8. A system for preserving sequencing of data units transiting a network node having multiple ports and multiple processor subsystems, said system comprising:

means, responsive to an insertion of one of said two or more of said data units into a specific one of said multiple processor subsystems, for associating with said specific one of said multiple processor subsystems a specific one of said multiple ports by which said one of said two or more of said data units entered said network node, for noting any other of said multiple processor subsystems that are currently processing on any other of said two or more data units that entered said network node through said specific one of said multiple ports; and means for transmitting said two or more of said data units from said network node according to said recorded sequence.

9. The system of claim 8, wherein said means for associating comprises means for creating a control register, having fields, for each of said multiple processor subsystems.

10. The system of claim 9, wherein said means for creating a control register, having fields, further comprises means for creating, for each of said multiple processor subsystems, a control register having a port identification field and one or more processor subsystem activity fields such that said processor subsystem activity fields are paired with each of said multiple processor subsystems.

11. The system of claim 9, wherein said means for noting further comprises:

means, responsive to said insertion of said one of said two or more data units into a specific one of said multiple processor subsystems, for checking to see if at least one other of said multiple processor subsystems is currently processing at least one other data unit which entered said network node through said specific one of said multiple ports; and means, responsive to a determination that at least one other of said multiple processor subsystems is currently processing at least one other data unit which entered said network node through said specific one of said multiple ports, for filling at least one other field of said created control register paired with said specific one of said multiple processors with at least one indicator that said at least one other of said multiple processor subsystems is currently processing at least one other data unit which entered said network node through said specific one of said multiple ports.

12. The system of claim 8, wherein said means for transmitting further comprises:

means, responsive to a request to transmit by said specific one of said multiple processors, for honoring said transmit request if said data unit within said specific one of said multiple processors is next according to said recorded sequence.

13. The system of claim 12, wherein said means for honoring further comprises:

means for determining whether at least one other of said multiple processor subsystems, that was processing at least one other data unit that entered said network node through said specific one of said multiple ports, is currently processing said at least one other data unit that entered said network node through said specific one of said multiple ports; and means, responsive to a determination that no at least one other of said multiple processor subsystems, that was processing at least one other data unit that entered said network node through said specific one of said multiple ports, is currently processing said at least one other data unit that entered said network node through said specific one of said multiple ports, for honoring said request by said specific one of said multiple processor subsystems to transmit said one of said two or more of said data units from said network node; and for notifying said multiple processor subsystems that said specific one of said multiple processor subsystems is no longer processing said one of said two or more data units.

14. The system of claim 13, wherein said means for notifying further comprises means for setting all processor subsystem activity fields, paired with said specific one of said multiple processor subsystems, to inactive.

15. A program product for preserving sequencing of data units transiting a network node having multiple ports and multiple processor subsystems, said program product comprising:

means, responsive to an insertion of one of said two or more of said data units into a specific one of said multiple processor subsystems, for associating with said specific one of said multiple processor subsystems a specific one of said multiple ports by which said one of said two or more of said data units entered said network node, for noting any other of said multiple processor subsystems that are currently processing on any other of said two or more data units that entered said network node through said specific one of said multiple ports, means for transmitting said two or more of said data units from said network node according to said recorded sequence; and signal bearing media bearing said means for recording and said means for transmitting.

16. The program product of claim 15, wherein said signal bearing media comprises transmission media.

17. The program product of claim 15, wherein said signal bearing media comprises recordable media.

18. The program product of claim 15, wherein said means for associating comprises means for creating a control register, having fields, for each of said multiple processor subsystems.

19. The program product of claim 18, wherein said means for creating a control register, having fields, further comprises means for creating, for each of said multiple processor subsystems, a control register having a port identification field and one or more processor subsystem activity fields such that said processor subsystem activity fields are paired with each of said multiple processor subsystems.

20. The program product of claim 18, wherein said means for noting further comprises:

means, responsive to said insertion of said one of said two or more data units into a specific one of said multiple processor subsystems, for checking to see if at least one other of said multiple processor subsystems is currently processing at least one other data unit which entered said network node through said specific one of said multiple ports; and means, responsive to a determination that at least one other of said multiple processor subsystems is currently processing at least one other data unit which entered said network node through said specific one of said multiple ports, for filling at least one other field of said created control register paired with said specific one of said multiple processors with at least one indicator that said at least one other of said multiple processor subsystems is currently processing at least one other data unit which entered said network node through said specific one of said multiple ports.

21. The program product of claim 15, wherein said means for transmitting further comprises:

means, responsive to a request to transmit by said specific one of said multiple processors, for honoring said request if said unit within said specific one of said multiple processors is next according to said recorded sequence.

22. The program product of claim 21, wherein said means for honoring further comprises:

means for determining whether at least one other of said multiple processor subsystems, that was processing at least one other data unit that entered said network node through said specific one of said multiple ports, is currently processing said at least one other data unit that entered said network node through said specific one of said multiple ports; and means, responsive to a determination that no at least one other of said multiple processor subsystems, that was processing at least one other data unit that entered said network node through said specific one of said multiple ports, is currently processing said at least one other data unit that entered said network node through said specific one of said multiple ports, for honoring said request by said specific one of said multiple processor subsystems to transmit said one of said two or more of said data units from said network node; and for notifying said multiple processor subsystems that said specific one of said multiple processor subsystems is no longer processing said one of said two or more data units.

23. The program product of claim 22, wherein said means for notifying further comprises means for setting all processor subsystem activity fields, paired with said specific one of said multiple processor subsystems, to inactive.

* * * * *